United States Patent
Miyagawa

(10) Patent No.: US 12,095,700 B2
(45) Date of Patent: Sep. 17, 2024

(54) ON-BOARD COMMUNICATION SYSTEM AND ON-BOARD CABLE

(71) Applicant: Sumitomo Electric Industries, Ltd., Osaka (JP)

(72) Inventor: Yuta Miyagawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 484 days.

(21) Appl. No.: 17/423,903

(22) PCT Filed: Jan. 28, 2020

(86) PCT No.: PCT/JP2020/002941
§ 371 (c)(1),
(2) Date: Jul. 19, 2021

(87) PCT Pub. No.: WO2020/158723
PCT Pub. Date: Aug. 6, 2020

(65) Prior Publication Data
US 2022/0094502 A1   Mar. 24, 2022

(30) Foreign Application Priority Data

Jan. 31, 2019 (JP) ................................ 2019-015309

(51) Int. Cl.
*H04L 5/00* (2006.01)
*B60R 16/023* (2006.01)
(Continued)

(52) U.S. Cl.
CPC .......... *H04L 5/0053* (2013.01); *B60R 16/023* (2013.01); *H04B 3/02* (2013.01); *H04L 67/12* (2013.01)

(58) Field of Classification Search
CPC .................. H04L 5/0053; H04L 67/12; H04L 2012/4073; B60R 16/023
See application file for complete search history.

(56) References Cited

U.S. PATENT DOCUMENTS

2009/0306844 A1* 12/2009 Arita .......................... B60R 1/26
  701/41
2011/0176560 A1*  7/2011 Mori ...................... H04L 12/417
  370/498

(Continued)

FOREIGN PATENT DOCUMENTS

JP      2004-221896     *   5/2004   ................ H04J 1/00
JP      2004-221896 A       8/2004

(Continued)

OTHER PUBLICATIONS

International Search Report and Written Opinion mailed on Mar. 17, 2020, received for PCT Application PCT/JP2020/002941, Filed on Jan. 28, 2020, 8 pages including English Translation.

*Primary Examiner* — Jamal Javaid
*Assistant Examiner* — Ryan C Kavleski
(74) *Attorney, Agent, or Firm* — XSENSUS LLP

(57) ABSTRACT

An on-board communication system includes a plurality of function units mounted on a vehicle and performing predetermined information communication, a plurality of communication units disposed respectively corresponding to the plurality of function units, and a plurality of wired transfer paths connecting the plurality of communication units to one another. Each of the plurality of communication units transmits and receives signals in a radio frequency band to and from the other communication units via the wired transfer paths, the signals being modulated and including communication information to be transferred among the function units.

17 Claims, 8 Drawing Sheets

(51) Int. Cl.
   *H04B 3/02*      (2006.01)
   *H04L 67/12*     (2022.01)

(56)           References Cited

U.S. PATENT DOCUMENTS

| | | | |
|---|---|---|---|
| 2013/0281035 A1* | 10/2013 | Ly-Gagnon | ............ H04B 17/19 |
| | | | 455/115.1 |
| 2014/0334568 A1 | 11/2014 | Gotou et al. | |
| 2015/0143091 A1* | 5/2015 | Brace | ................. G06F 9/44505 |
| | | | 713/1 |
| 2016/0006807 A1* | 1/2016 | Bangole | ................. H04L 67/60 |
| | | | 709/219 |
| 2020/0351387 A1* | 11/2020 | Bhimavarapu | ......... H04L 69/08 |
| 2021/0013993 A1* | 1/2021 | Kondo | ................ H04L 27/0008 |

FOREIGN PATENT DOCUMENTS

| | | |
|---|---|---|
| JP | 2005-236400 A | 9/2005 |
| JP | 2006-333263 A | 12/2006 |
| JP | 2007-67527 A | 3/2007 |
| JP | 2009-177785 A | 8/2009 |
| JP | 2013-123132 A | 6/2013 |
| WO | 2006/120757 A1 | 11/2006 |

* cited by examiner

FIG. 5

| MAC ADDRESS OF FUNCTION UNIT AT TRANSMISSION SOURCE | MAC ADDRESS OF FUNCTION UNIT AT TRANSMISSION TARGET | CARRIER FREQUENCY |
|---|---|---|
| MAC-A | MAC-B | 5GHz |
| MAC-A | MAC-C | 4GHz |
| MAC-A | MAC-D | 3GHz |
| MAC-A | MAC-E | 2GHz |
| MAC-B | MAC-A | 5GHz |
| MAC-B | MAC-C | 4.8GHz |
| MAC-B | MAC-D | 3.8GHz |
| MAC-B | MAC-E | 2.8GHz |
| MAC-C | MAC-A | 4GHz |
| MAC-C | MAC-B | 4.8GHz |
| MAC-C | MAC-D | 2.4GHz |
| MAC-C | MAC-E | 3.6GHz |
| MAC-D | MAC-A | 3GHz |
| MAC-D | MAC-B | 3.8GHz |
| MAC-D | MAC-C | 2.4GHz |
| MAC-D | MAC-E | 2.2GHz |
| MAC-E | MAC-A | 2GHz |
| MAC-E | MAC-B | 2.8GHz |
| MAC-E | MAC-C | 3.6GHz |
| MAC-E | MAC-D | 2.2GHz |

FIG. 6

| MAC ADDRESS OF FUNCTION UNIT AT TRANSMISSION SOURCE | MAC ADDRESS OF FUNCTION UNIT AT TRANSMISSION TARGET | TRANSMISSION POWER |
|---|---|---|
| MAC-A | MAC-B | 18dBm |
| MAC-A | MAC-C | 19dBm |
| MAC-A | MAC-D | 20dBm |
| MAC-A | MAC-E | 21dBm |
| MAC-B | MAC-A | 18dBm |
| MAC-B | MAC-C | 18dBm |
| MAC-B | MAC-D | 19dBm |
| MAC-B | MAC-E | 20dBm |
| MAC-C | MAC-A | 19dBm |
| MAC-C | MAC-B | 18dBm |
| MAC-C | MAC-D | 18dBm |
| MAC-C | MAC-E | 19dBm |
| MAC-D | MAC-A | 20dBm |
| MAC-D | MAC-B | 19dBm |
| MAC-D | MAC-C | 18dBm |
| MAC-D | MAC-E | 18dBm |
| MAC-E | MAC-A | 21dBm |
| MAC-E | MAC-B | 20dBm |
| MAC-E | MAC-C | 19dBm |
| MAC-E | MAC-D | 18dBm |

FIG. 7

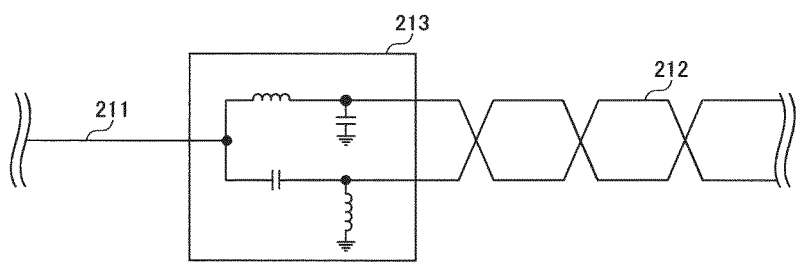

ON-BOARD COMMUNICATION SYSTEM AND ON-BOARD CABLE

CROSS-REFERENCE TO RELATED APPLICATIONS

The present application is based on PCT filing PCT/JP2020/002941, filed Jan. 28, 2020, which claims priority to Japanese Patent Application No. 2019-015309, filed on Jan. 31, 2019, the entire contents of each are incorporated herein by reference.

TECHNICAL FIELD

The present invention relates to an on-board communication system and an on-board cable.

BACKGROUND ART

Patent Literature (PTL) 1 (Japanese Unexamined Patent Application Publication No. 2009-177785) discloses the following technique. An on-board wireless communication device includes a plurality of antennas for different frequencies, a multiplexing circuit, a demultiplexing circuit, and a plurality of wireless devices corresponding to the plurality of antennas for different frequencies. The plurality of antennas are connected to one of the multiplexing circuit and the demultiplexing circuit and are disposed on one of a roof, an upper region of a front windshield, and an upper region of a rear windshield of a vehicle together with the multiplexing circuit or the demultiplexing circuit to which the antennas are connected. The plurality of wireless devices are connected, by wireless-device-side antenna cables, to the other one of the multiplexing circuit and the demultiplexing circuit to which the antennas are not connected. The multiplexing circuit and the demultiplexing circuit are connected by an antenna-side antenna cable wired through a pillar.

CITATION LIST

Patent Literature

PTL 1: Japanese Unexamined Patent Application Publication No. 2009-177785

SUMMARY OF INVENTION (1) The present disclosure provides an on-board communication system including a plurality of function units mounted on a vehicle and performing predetermined information communication, a plurality of communication units disposed respectively corresponding to the plurality of function units, and a plurality of wired transfer paths connecting the plurality of communication units to one another, wherein each of the plurality of communication units transmits and receives signals in a radio frequency band to and from the other communication units via the wired transfer paths, the signals being modulated and including communication information to be transferred among the function units.

(6) The present disclosure further provides an on-board cable mounted on a vehicle including a plurality of function units, the on-board cable including a connector portion connectable to one of the function units, and a cable portion capable of transferring a signal in a radio frequency band, the signal being modulated, wherein the connector portion outputs, to the cable portion, the signal including communication information to be transferred between the function units.

An embodiment of the present disclosure can be implemented as a semiconductor integrated circuit forming part or the entirety of the on-board communication system.

BRIEF DESCRIPTION OF DRAWINGS

FIG. 5 illustrates an example of frequency correspondence information in the on-board communication system according to the first embodiment of the present invention.

FIG. 6 illustrates an example of power correspondence information in the on-board communication system according to the first embodiment of the present invention.

FIG. 7 illustrates an example of a configuration of a wired transfer path in the on-board communication system according to the first embodiment of the present invention.

DESCRIPTION OF EMBODIMENTS

Figure 1:
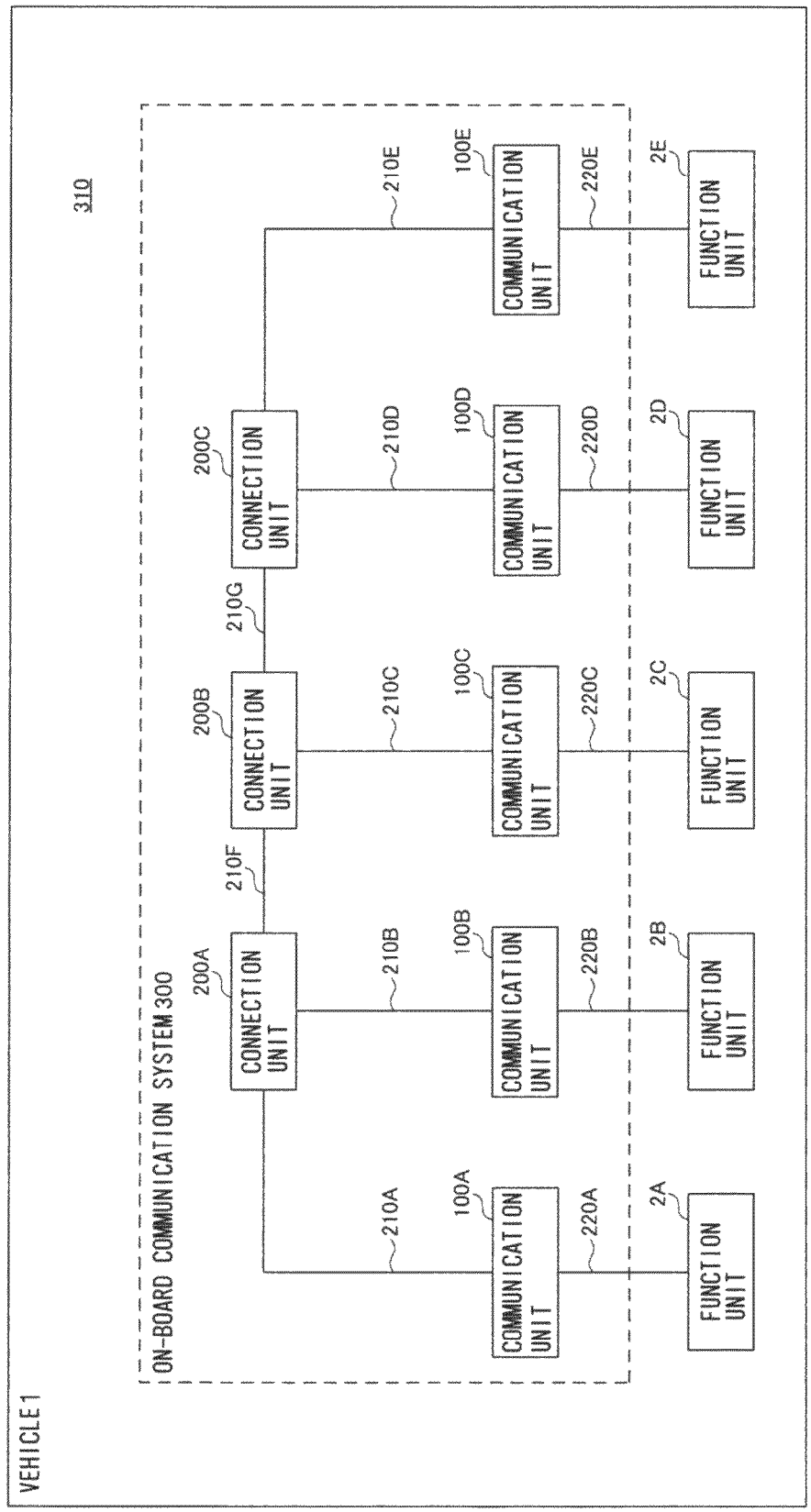
FIG. 1 is a block diagram illustrating a configuration of an on-board communication system according to a first embodiment of the present invention.

Problems to be Solved by Present Disclosure

There is demanded a technique capable of realizing stable communication among a plurality of function units in a vehicle with a simple configuration beyond a level of the technique disclosed in PTL 1.

With intent to solve the above-mentioned problem, an object of the present disclosure is to provide an on-board communication system and an on-board cable each of which can realize the stable communication among the plurality of function units in the vehicle with the simple configuration.

Advantageous Effects of Present Disclosure

According to the present disclosure, the stable communication can be realized among the plurality of function units in the vehicle with the simple configuration.

Description of Embodiments of Present Invention

First, features of embodiments of the present invention are described.

(1) An on-board communication system according to one embodiment of the present invention includes a plurality of function units mounted on a vehicle and performing predetermined information communication, a plurality of communication units disposed respectively corresponding to the plurality of function units, and a plurality of wired transfer paths connecting the plurality of communication units to one another, wherein each of the plurality of communication units transmits and receives signals in a radio frequency band to and from the other communication units via the wired transfer paths, the signals being modulated and including communication information to be transferred among the function units.

Thus, since the wired transfer paths are used in an on-board network to transmit and receive radio frequency signals including the communication information to be transferred among the function units, namely the modulated signals in the radio frequency band, the radio frequency signals in various frequency bands and in accordance with various modulation schemes, for example, can be transferred via the wired transfer paths and hence a degree of freedom in setting of communication among the function units can be increased. Furthermore, since the wired transfer path used as a transfer path for the radio frequency signal can be branched by using a passive component with adjustment of impedance matching, a degree of freedom in wiring can also be increased. Moreover, the number of active components required, for example, when the many communication units are connected to one another via the wired transfer paths can be made zero or reduced. Reduction of the number of the active components makes it possible to reduce power consumption, to suppress heat generation, and to suppress communication errors attributable to noise caused in power supply lines that are connected to the active components. In addition, since the on-board network may need to use, for example, just one cable as a main line for a transfer system, it is possible to reduce the number of cables to be used and the number of connector ports to be used. As a result, with the on-board communication system according to the first embodiment of the present invention, stable communication among the function units can be realized with a simple configuration in the on-board network.

(2) Preferably, the on-board communication system includes three or more communication units capable of transmitting and receiving the signals via the wired transfer paths among the three or more communication units, the communication units belonging to at least one pair among multiple pairs of the communication units transmitting and receiving the signals therebetween transmit and receive the signals at a carrier frequency different from one or more carrier frequencies used by the communication units belonging to the other one or more pairs, and the signals at the different carrier frequencies are transmitted and received via the wired transfer paths in common.

With the above feature, since one pair of the communication units transmit and receive the radio frequency signals at the carrier frequency different from that used by another pair, those pairs of the communication units can transmit and receive the radio frequency signals in parallel. Therefore, communication processing can be simplified while suppressing a communication delay that may be caused due to, for example, wait for start of transmission to avoid collision of the radio frequency signals in the wired transfer path.

(3) Preferably, each of the plurality of communication units is able to set a carrier frequency of the signal transmitted from itself.

With the above feature, attenuation of the radio frequency signal can be suppressed and communication quality can be improved, for example, by setting the carrier frequency of the radio frequency signal to be lower as the wired transfer path between the communication units is longer.

(4) Preferably, each of the plurality of communication units is able to set transmission power of the signal transmitted from itself.

With the above feature, deterioration of a SN (Signal-Noise) ratio can be suppressed and communication quality can be improved, for example, by setting the transmission power of the radio frequency signal to be greater as the wired transfer path between the communication units is longer.

(5) Preferably, each of the plurality of communication units is connected via the wired transfer path to a connection unit that performs at least one between multiplexing and demultiplexing for one or more of the signals.

With above feature, in the on-board communication system in which the three or more function units can communicate with one another via the wired transfer paths and the connection units, stable communication between the function units can be realized with the simple configuration by transmitting and receiving the radio frequency signals including the communication information to be transferred between the function units.

(6) An on-board cable according to another embodiment of the present invention is mounted on a vehicle including a plurality of function units, the on-board cable including a connector portion connectable to one of the function unit, and a cable portion capable of transferring a signal in a radio frequency band, the signal being modulated, wherein the connector portion outputs, to the cable portion, the signal including communication information to be transferred between the function units.

With the above feature of including the connector portion that outputs, to the cable portion, the radio frequency signal including the communication information to be transferred between the function units, namely the modulated signal in the radio frequency band, the radio frequency signals in various frequency bands and in accordance with various modulation schemes, for example, can be transferred via the on-board cable in the on-board network and hence a degree of freedom in setting of communication among the function units can be increased. Furthermore, since the cable portion used as a transfer path for the radio frequency signal can be branched by using a passive component, the number of active components required when the many function units are connected to one another via the on-board cables can be made zero or reduced. Reduction of the number of the active components makes it possible to reduce power consumption, to suppress heat generation, and to suppress communication errors attributable to noise caused in power supply lines that are connected to the active components. As a result, stable communication among the function units can be realized with a simple configuration in the on-board network.

(7) Preferably, the connector portion includes the communication unit creating the signal, and the communication unit is able to set the carrier frequency of the signal created by itself.

With the above feature, attenuation of the radio frequency signal can be suppressed and communication quality can be improved, for example, by setting the carrier frequency of the radio frequency signal to be lower as the wired transfer path between the communication units is longer.

The embodiments of the present invention will be described below with reference to the drawings. The same or corresponding components in the drawings are denoted by the same reference signs and description of those components is not repeated. At least parts of the embodiments described below may be optionally combined with each other.

First Embodiment

[Configuration and Basic Operation]

FIG. 1 is a block diagram illustrating a configuration of an on-board communication system according to a first embodiment of the present invention.

Referring to FIG. 1, the on-board communication system 300 includes a plurality of communication units 100A, 100B, 100C, 100D and 100E. The communication units 100A, 100B, 100C, 100D and 100E are disposed respectively corresponding to a plurality of function units 2A, 2B, 2C, 2D and 2E mounted on a vehicle 1. In the following, each of the communication units 100A, 100B, 100C, 100D and 100E is also called a communication unit 100, and each of the function units 2A, 2B, 2C, 2D and 2E is also called a function unit 2.

The on-board communication system 300 includes a plurality of wired transfer paths connecting the communication units 100 to one another. For example, the communication unit 100A and the function unit 2A are connected to each other via a wired transfer path 220A. The communication unit 100B and the function unit 2B are connected to each other via a wired transfer path 220B. The communication unit 100C and the function unit 2C are connected to each other via a wired transfer path 220C. The communication unit 100D and the function unit 2D are connected to each other via a wired transfer path 220D. The communication unit 100E and the function unit 2E are connected to each other via a wired transfer path 220E. In the following, each of the wired transfer paths 220A, 220B, 220C, 220D and 220E is also called a wired transfer path 220.

The wired transfer path 220 is a path in conformity with standards such as Ethernet (registered trademark), for example. The wired transfer path 220 may be a path in conformity with other standards, for example, CAN (Controller Area Network) (registered trademark) or may be an optical fiber cable.

The function unit 2 is, for example, any of various control ECUs (Electronic Control Units) such as a self-driving ECU, an engine control ECU, and a transmission control ECU, a camera, a radar device, and a navigation device, and executes a predetermined function. The function unit 2 performs predetermined information communication.

For example, the navigation device as an example of the function unit 2 obtains map information from a map server disposed outside the vehicle 1 via a TCU (Telematics Communication Unit). An image sensor as an example of the function unit 2 periodically takes an image of surroundings of the vehicle 1 and creates image information representing a result of the image-taking. The radar device as an example of the function unit 2 periodically creates detection information representing a result of detecting an object, for example, a pedestrian around the vehicle 1 by utilizing a millimeter wave. The self-driving ECU creates control information to assist self-driving based on both the image information received from the image sensor and the detection information received from the radar device.

The function unit 2 transfers an Ethernet frame including communication information, such as the obtained map information and the created image information, detection information, and control information, to and from the other function units 2 through the communication unit 100.

The on-board communication system 300 includes, for example, the three or more communication units 100 capable of transmitting and receiving among them alternating current signals in a radio frequency band (hereinafter also called "radio frequency signals"), namely signals at radio frequencies, those signals being each modulated in accordance with a modulation scheme used in wireless communication.

In the example illustrated in FIG. 1, the on-board communication system 300 includes the five communication units 100 and connection units 200A, 200B and 200C.

In more detail, the communication unit 100A and the connection unit 200A are connected to each other via a wired transfer path 210A. The communication unit 100B and the connection unit 200A are connected to each other via a wired transfer path 210B. The communication unit 100C and the connection unit 200B are connected to each other via a wired transfer path 210C. The communication unit 100D and the connection unit 200C are connected to each other via a wired transfer path 210D. The communication unit 100E and the connection unit 200C are connected to each other via a wired transfer path 210E. The connection unit 200A and the connection unit 200B are connected to each other via a wired transfer path 210F. The connection unit 200B and the connection unit 200C are connected to each other via a wired transfer path 210G.

In the following, each of the wired transfer paths 210A, 210B, 210C, 210D, 210E, 210F and 210G is also called a wired transfer path 210, and each of the connection unit 200A, 200B and 200C is also called a connection unit 200. An on-board network 310 is formed by the function units 2, the communication units 100, and the wired transfer paths 210.

Each wired transfer path 210 is, for example, a coaxial cable. The coaxial cable serving as the wired transfer path 210A, for example, is disposed with a connector at one end being connected to the communication unit 100A and a connector at the other end being connected to the connection unit 200A. The coaxial cable serving as the wired transfer path 210F, for example, is disposed with a connector at one end being connected to the connection unit 200A and a connector at the other end being connected to the connection unit 200B. The wired transfer path 210 is not limited to the coaxial cable and may be, for example, a waveguide.

The communication units 100 transmit and receive the radio frequency signals among them via the wired transfer paths 210, those signals including the communication information to be transferred among the function units 2.

In more detail, the function unit 2 creates an Ethernet frame including the obtained or created communication information, a MAC address of the function unit 2 at a transmission target, and a MAC address of the function unit 2 at a transmission source, and transmits the created Ethernet frame to the corresponding communication unit 100.

Upon receiving the Ethernet frame from the corresponding function unit 2, the communication unit 100 creates the radio frequency signal including the received Ethernet frame and transmits the created radio frequency signal to another communication unit 100 via the wired transfer path 210. The other communication unit 100 creates the Ethernet frame from the received radio frequency signal and transmits the created Ethernet frame to the corresponding function unit 2.

The connection unit 200 performs at least one between multiplexing and demultiplexing for one or more radio frequency signals received via one or more wired transfer paths 210 and outputs resulting one or more signals to the other one or more wired transfer paths 210.

In the example illustrated in FIG. 1, the wired transfer paths 210A, 210B and 210F are connected to the connection unit 200A. The connection unit 200A performs multiplexing or demultiplexing for one or more radio frequency signals received via one or more of the wired transfer paths 210A, 210B and 210F, and outputs resulting one or more signals to the other one or more wired transfer paths.

For example, the communication unit 100 can set a carrier frequency of the radio frequency signal transmitted from itself. For example, the communication unit 100 sets the carrier frequency of the radio frequency signal depending on a transfer line length of the wired transfer path 210 between itself and another communication unit 100 that is a communication partner. For example, the communication unit 100 sets the carrier frequency of the radio frequency signal to be lower as the transfer line length is longer.

For example, the communication units 100 belonging to at least one pair among multiple pairs of the communication units 100 transmitting and receiving the radio frequency signals therebetween transmit and receive the radio frequency signals at a carrier frequency different from that used by the communication units 100 belonging to the other one or more pairs. In other words, in the on-board communication system 300, the plurality of radio frequency signals at carrier frequencies different from each other are transmitted and received via the wired transfer path 210 in common.

In more detail, for example, a pair of the communication unit 100A and the communication unit 100B transmit and receive the radio frequency signals at a carrier frequency f1 via the connection unit 200A and the wired transfer paths 210A and 210B. A pair of the communication unit 100A and the communication unit 100C transmit and receive the radio frequency signals at a carrier frequency f2 via the connection units 200A and 200B and the wired transfer paths 210A, 210F and 210C. A pair of the communication unit 100A and the communication unit 100D transmit and receive the radio frequency signals at a carrier frequency f3 via the connection units 200A, 200B and 200C and the wired transfer paths 210A, 210F, 210G and 210D.

For example, when the function unit 2A broadcasts an Ethernet frame to the function units 2B, 2C, 2D and 2E, the function units 2B, 2C, 2D and 2E create the relevant Ethernet frame from the radio frequency signal at the same carrier frequency transmitted from the communication unit 100A. Furthermore, when the function units 2B, 2C, 2D and 2E transmit Ethernet frames to the function unit 2A in reply to the broadcasted Ethernet frame, the communication units 100B, 100C, 100D and 100E may transmit, as the radio frequency signals to be created from the corresponding Ethernet frames, the radio frequency signals at carrier frequencies different from each other or the radio frequency signals at the same carrier frequency to the communication unit 100A.

Details of setting of the carrier frequency of the radio frequency signal by the communication unit 100 will be described later.

For example, the communication unit 100 can set transmission power of the radio frequency signal transmitted from itself. For example, the communication unit 100 sets the transmission power of the radio frequency signal depending on the transfer line length, namely the length of the wired transfer path 210 between itself and another communication unit 100 that is the communication partner. For example, the communication unit 100 sets the transmission power of the radio frequency signal to be greater as the transfer line length is longer. Details of setting of the transmission power of the radio frequency signal by the communication unit 100 will be described later.

[Connection Unit]

Figure 2:
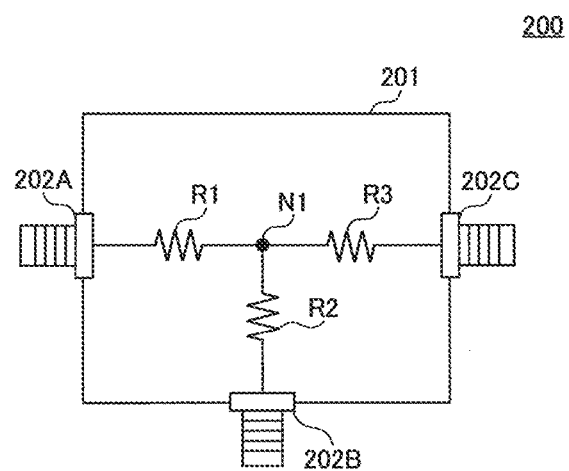
FIG. 2 illustrates an example of a configuration of a connection unit in the on-board communication system according to the first embodiment of the present invention.

FIG. 2 illustrates an example of a configuration of the connection unit in the on-board communication system according to the first embodiment of the present invention.

Referring to FIG. 2, the connection unit 200 is, for example, a passive component and includes a main body 201 and terminals 202A, 202B and 202C. The main body 201 includes resistances R1, R2 and R3. In the following, each of the terminals 202A, 202B and 202C is also called a terminal 202. The wired transfer path 210 is connected to the terminal 202.

In the main body 201, the resistance R1 is connected between the terminal 202A and a node N1, the resistance R2 is connected between the terminal 202B and the node N1, and the resistance R3 is connected between the terminal 202C and the node N1. Resistance values of the resistances R1, R2 and R3 are each, for example, 50/3 ohms, namely about 16.7 ohms.

For example, the connection unit 200 demultiplexes the radio frequency signal received by one of the terminals 202A, 202B and 202C and outputs demultiplexed signals to the other two terminals. Furthermore, the connection unit 200 multiplexes the radio frequency signals received by two of the terminals 202A, 202B and 202C and outputs a multiplexed signal to the other one terminal.

Figure 3:
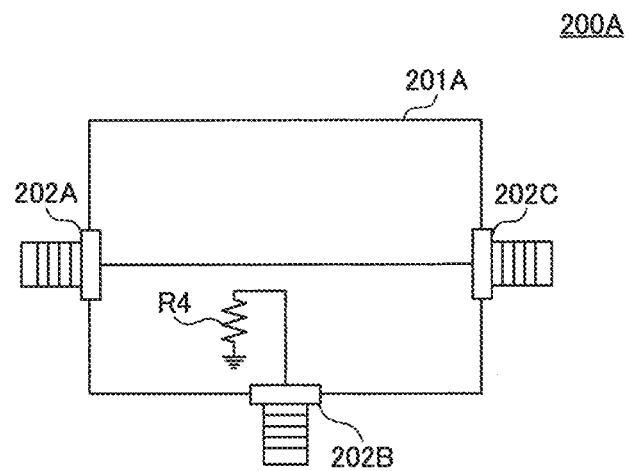
FIG. 3 illustrates another example of the configuration of the connection unit in the on-board communication system according to the first embodiment of the present invention.

FIG. 3 illustrates another example of the configuration of the connection unit in the on-board communication system according to the first embodiment of the present invention.

Referring to FIG. 3, the connection unit 200A includes a main body 201A and terminals 202A, 202B and 202C.

In the main body 201A, the terminals 202A and 202C are connected to each other. The terminal 202B is grounded through a resistance R4 of 50 ohms, for example, and is connected to the terminals 202A and 202C through, for example, dielectrics not illustrated.

[Communication Unit]

Figure 4:
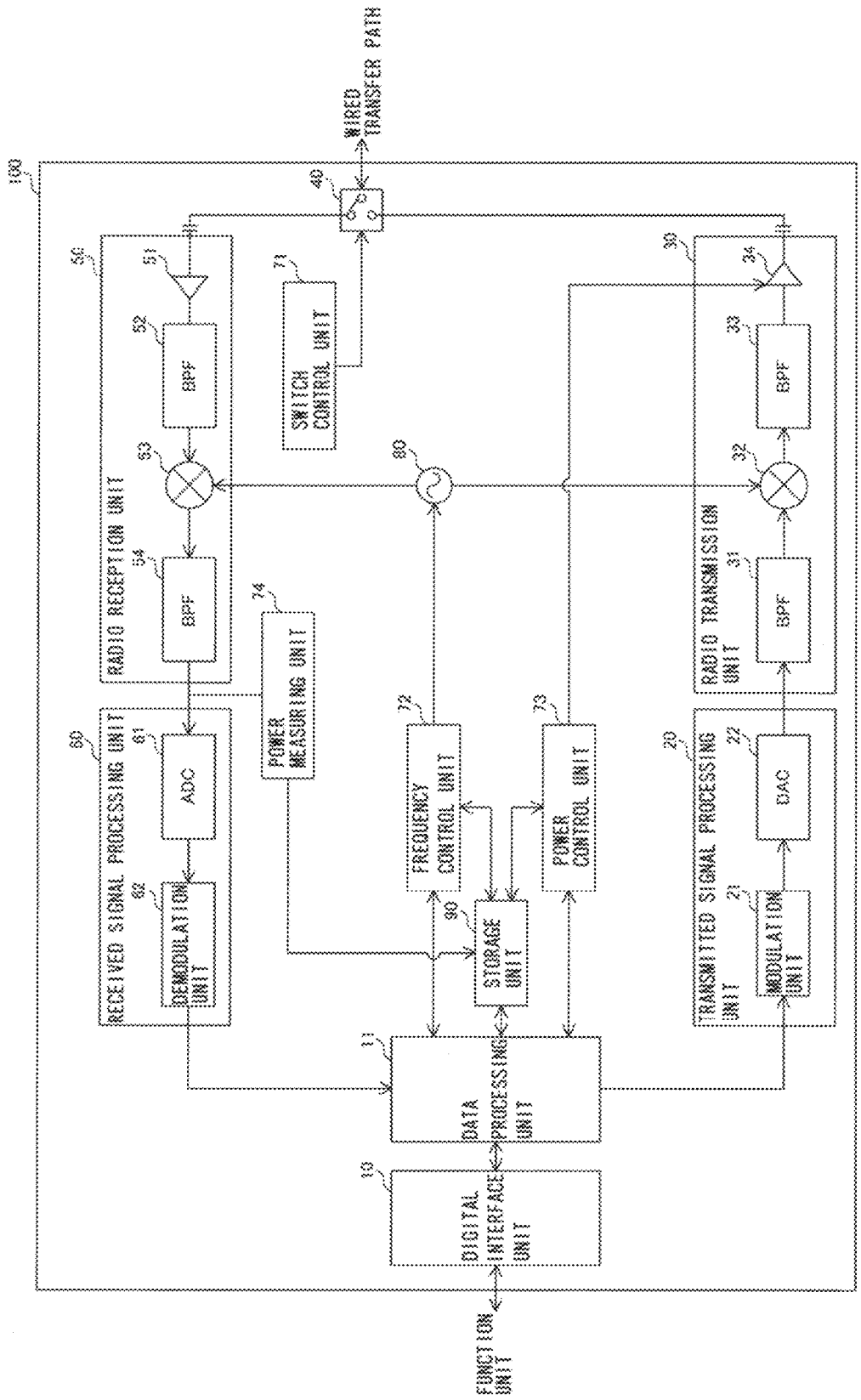
FIG. 4 is a block diagram illustrating a configuration of a communication unit in the on-board communication system according to the first embodiment of the present invention.

FIG. 4 is a block diagram illustrating a configuration of the communication unit in the on-board communication system according to the first embodiment of the present invention.

Referring to FIG. 4, the communication unit 100 includes a digital interface unit 10, a data processing unit 11, a transmitted signal processing unit 20, a radio transmission unit 30, a transmission/reception changeover switch 40, a radio reception unit 50, a received signal processing unit 60, a switch control unit 71, a frequency control unit 72, a power control unit 73, a power measuring unit 74, an oscillator 80, and a storage unit 90. The storage unit 90 includes, for example, a nonvolatile storage area.

The digital interface unit 10 outputs the Ethernet frame received from the function unit 2 to the data processing unit 11. Furthermore, the digital interface unit 10 transmits the Ethernet frame received from the data processing unit 11 to the function unit 2.

Upon receiving the Ethernet frame from the digital interface unit 10, the data processing unit 11 outputs the received Ethernet frame to the transmitted signal processing unit 20. Furthermore, upon receiving demodulated data from the received signal processing unit 60, the data processing unit 11 creates an Ethernet frame from the received demodulated data and outputs the created Ethernet frame to the digital interface unit 10.

Upon receiving the Ethernet frame from the digital interface unit 10, the data processing unit 11 further obtains the MAC address of the function unit 2 at the transmission target and the MAC address of the function unit 2 at the transmission source from the received Ethernet frame, and outputs the obtained MAC addresses to the frequency control unit 72 and the power control unit 73.

For example, the transmitted signal processing unit 20 creates modulated data by modulating the Ethernet frame received from the data processing unit 11, converts the created modulated data to an analog signal, and outputs the analog signal.

In more detail, the transmitted signal processing unit 20 includes a modulation unit 21 and a digital/analog converter (DAC) 22.

The modulation unit 21 creates modulated data by performing signal processing, such as IFFT (Inverse Fast Fourier Transform) in accordance with an OFDM (Orthogonal Frequency Division Multiplex) scheme, for example, on the Ethernet frame received from the data processing unit 11, and outputs the created modulated data to the DAC 22, The modulation unit 21 may be constituted to perform another type of modulation such as QAM (Quadrature Amplitude Modulation) or PSK (Phase Shift Keying), or may be constituted to create the modulated data by performing modulations in accordance with a plurality of schemes.

The DAC 22 converts the modulated data received from the modulation unit 21 to an analog signal and outputs the converted analog signal to the radio transmission unit 30.

The radio transmission unit 30 converts the analog signal received from the transmitted signal processing unit 20 to a radio frequency signal and outputs the converted radio frequency signal to the transmission/reception changeover switch 40.

In more detail, the radio transmission unit 30 includes a bandpass filter (BPF) 31, a mixer 32, a BPF 33, and a transmission amplifier 34.

The BPF 31 outputs, to the mixer 32, a signal that is obtained by attenuating frequency components of the analog signal received from the DAC 22 except for a component in a predetermined frequency band.

The mixer 32 up-converts the analog signal received from the BPF 31 by multiplying the analog signal received from the BPF 31 by a frequency conversion signal received from the oscillator 80 for conversion to a radio frequency signal, namely a signal in an RF (Radio Frequency) band, and outputs the radio frequency signal to the BPF 33.

The BPF 33 outputs, to the transmission amplifier 34, a signal that is obtained by attenuating frequency components of the radio frequency signal received from the mixer 32 except for a component in a predetermined frequency band.

The transmission amplifier 34 amplifies the radio frequency signal received from the BPF 33 by a gain in accordance with a control signal received from the power control unit 73, and outputs the amplified radio frequency signal to the transmission/reception changeover switch 40.

The switch control unit 71 outputs a switch control signal to the transmission/reception changeover switch 40, thus regularly or irregularly changing over the transmission/reception changeover switch 40.

The transmission/reception changeover switch 40 switches, in accordance with the switch control signal received from the switch control unit 71, whether the radio frequency signal received from the radio transmission unit 30 is output to the wired transfer path 210 or the radio frequency signal received from the wired transfer path 210 is output to the radio reception unit 50.

The radio reception unit 50 creates an analog signal in a base band, for example, by down-converting the radio frequency signal received from the transmission/reception changeover switch 40, and outputs the created analog signal to the received signal processing unit 60.

In more detail, the radio reception unit 50 includes a reception amplifier 51, a BPF 52, a mixer 53, and a BPF 54.

The reception amplifier 51 amplifies the radio frequency signal received from the transmission/reception changeover switch 40 and outputs the amplified signal to the BPF 52.

The BPF 52 outputs, to the mixer 53, a signal that is obtained by attenuating frequency components of the radio frequency signal received from the reception amplifier 51 except for a component in a predetermined frequency band.

The mixer 53 down-converts the radio frequency signal received from the BPF 52 by multiplying the radio frequency signal received from the BPF 52 by a frequency conversion signal received from the oscillator 80, thus creating an analog signal, and outputs the created analog signal to the BPF 54.

The BPF 54 outputs, to the received signal processing unit 60, a signal that is obtained by attenuating frequency components of the analog signal received from the mixer 53 except for a component in a predetermined frequency band.

For example, the received signal processing unit 60 creates demodulated data by demodulating the analog signal received from the radio reception unit 50, and outputs the created demodulated data to the data processing unit 11.

In more detail, the received signal processing unit 60 includes an analog/digital converter (ADC) 61 and a demodulation unit 62.

The ADC 61 converts the analog signal received from the BPF 54 to a digital signal and outputs the converted digital signal to the demodulation unit 62.

The demodulation unit 62 creates demodulated data by performing signal processing, such as FFT (Fast Fourier Transform) in accordance with the OFDM scheme, for example, on the digital signal received from the ADC 61, and outputs the created demodulated data to the data processing unit 11.

By outputting a frequency control signal F to the oscillator 80, the frequency control unit 72 controls the frequency conversion signal to be output from the oscillator 80.

The oscillator 80 creates the frequency conversion signal that is in the form of a sinusoidal form and has a frequency depending on a level of the frequency control signal F received from the frequency control unit 72, and outputs the created frequency conversion signal to the mixer 32 or 53.

For example, the storage unit 90 stores frequency correspondence information representing a relationship between a pair of the MAC address of the function unit 2 at the transmission source and the MAC address of the function unit 2 at the transmission target and the carrier frequency of the radio frequency signal that is transmitted and received between the communication unit 100 corresponding to the function unit 2 at the transmission source and the communication unit 100 corresponding to the function unit 2 at the transmission target.

Upon receiving the MAC address of the function unit 2 at the transmission source and the MAC address of the function unit 2 at the transmission target from the data processing unit 11, the frequency control unit 72 refers to the frequency correspondence information in the storage unit 90 and sets the carrier frequency of the radio frequency signal to be transmitted and received between the communication units 100 corresponding to each other based on the MAC address of the function unit 2 at the transmission source, the MAC address of the function unit 2 at the transmission target, and the frequency correspondence information.

FIG. 5 illustrates an example of the frequency correspondence information in the on-board communication system according to the first embodiment of the present invention.

In the following, for convenience of explanation, it is assumed that a MAC address of the function unit 2A is "MAC-A", a MAC address of the function unit 2B is "MAC-B", a MAC address of the function unit 2C is "MAC-C", a MAC address of the function unit 2D is "MAC-D", and a MAC address of the function unit 2E is "MAC-E".

For example, when the function unit 2A transmits the Ethernet frame to the function unit 2B via the communication units 100A and 100B, the frequency control unit 72 in the communication unit 100A sets the carrier frequency of the radio frequency signal to 5 GHz by referring to FIG. 5.

The frequency control unit 72 creates the frequency control signal F with a level corresponding to the set carrier frequency and outputs the created frequency control signal F to the oscillator 80.

For example, the storage unit 90 stores a LUT (Look Up Table) representing the level of the frequency control signal F corresponding to the carrier frequency. By referring to the LUT in the storage unit 90, the frequency control unit 72 creates the frequency control signal F with the level corresponding to the carrier frequency. In another example, the storage unit 90 may store frequency correspondence information in which the carrier frequency in the above-described frequency correspondence information is replaced with the level of the frequency control signal F, and the frequency control unit 72 may create the frequency control signal F by referring to the modified frequency correspondence information stored in the storage unit 90.

The power control unit 73 controls the gain of the transmission amplifier 34 by outputting a gain control signal G to the transmission amplifier 34.

For example, the storage unit 90 stores power correspondence information representing a relationship between a pair of the MAC address of the function unit 2 at the transmission source and the MAC address of the function unit 2 at the transmission target and the transmission power of the radio frequency signal that is transmitted and received between the communication unit 100 corresponding to the function unit 2 at the transmission source and the communication unit 100 corresponding to the function unit 2 at the transmission target.

Upon receiving the MAC address of the function unit 2 at the transmission source and the MAC address of the function unit 2 at the transmission target from the data processing unit 11, the power control unit 73 refers to the power correspondence information in the storage unit 90 and sets the transmission power of the radio frequency signal to be transmitted and received between the communication units 100 corresponding to each other based on the MAC address of the function unit 2 at the transmission source, the MAC address of the function unit 2 at the transmission target, and the power correspondence information.

FIG. 6 illustrates an example of the power correspondence information in the on-board communication system according to the first embodiment of the present invention.

For example, when the function unit 2A transmits the Ethernet frame to the function unit 2B, the power control unit 73 in the communication unit 100A sets the transmission power of the radio frequency signal to 18 dBm by referring to FIG. 6.

The power control unit 73 creates the gain control signal G with a level corresponding to the set transmission power and outputs the created gain control signal G to the transmission amplifier 34.

For example, the storage unit 90 stores a LUT representing the level of the gain control signal G corresponding to the transmission power. By referring to the LUT in the storage unit 90, the power control unit 73 creates the gain control signal G with the level corresponding to the transmission power. In another example, the storage unit 90 may store power correspondence information in which the transmission power in the above-described power correspondence information is replaced with the level of the gain control signal G, and the power control unit 73 may create the gain control signal G by referring to the modified power correspondence information stored in the storage unit 90.

The data processing unit 11 in the communication unit 100 functioning as a master unit, for example, in the communication unit 100A, functions as a communication control unit for controlling communication in the on-board communication system 300. The data processing unit 11 in the communication unit 100A creates the frequency correspondence information and the power correspondence information and transmits the created frequency correspondence information and power correspondence information to each of the other communication units 100 in the on-board communication system 300 other than the communication unit 100A. Each communication unit 100 (hereinafter also called a "slave communication unit 100") other than the communication unit 100A receives the frequency correspondence information and the power correspondence information and stores the received frequency correspondence information and power correspondence information in the storage unit 90 thereof.

In more detail, each communication unit 100 can transmit and receive information, such as the frequency correspondence information and the power correspondence information, in a previously assigned frequency band (hereinafter also called a "common frequency band").

The data processing unit 11 in the communication unit 100A creates a radio frequency signal in the common frequency band, the radio frequency signal including a packet for measurement of reception power, and transmits the created radio frequency signal to the slave communication unit 100 with a predetermined value of the transmission power.

The power measuring unit 74 in the slave communication unit 100 measures power of the received radio frequency signal by detecting, for example, a level of the analog signal output from the BPF 54. The power measuring unit 74 in each slave communication unit 100 measures the reception power of the received packet for the measurement of the reception power and stores a measurement result in the storage unit 90.

The data processing unit 11 in the communication unit 100A transmits, to the slave communication unit 100, a radio frequency signal including request information for inquiring the reception power.

The slave communication unit 100 obtains, as a reply to the request information received from the communication unit 100A, the measurement result of the reception power from the storage unit 90 and transmits a radio frequency signal representing the obtained measurement result to the communication unit 100A.

Upon receiving the measurement results of the reception power from the individual slave communication units 100, the data processing unit 11 in the communication unit 100A calculates transfer path lengths between the individual communication units 100 based on the measurement results. The data processing unit 11 creates the frequency correspondence information and the power correspondence information based on the calculated transfer path lengths. The data processing unit 11 creates the power correspondence information, for example, such that the transmission power of the radio frequency signal at each carrier frequency is held lower than or equal to an upper limit value of the transmission power, the upper limit value being calculated from the viewpoint of, for example, EMI (Electro Magnetic Interface).

The data processing unit 11 in the communication unit 100A may be constituted to create the frequency correspondence information based on noise environment of each slave communication unit 100.

In more detail, for example, the communication unit 100A sets a transmission stop period in which transmission of a radio frequency signal is to be stopped in each communication unit 100, creates a radio frequency signal including information that represents the set transmission stop period, and transmits the created radio frequency signal to the slave communication unit 100.

Each slave communication unit 100 measures the reception power in the transmission stop period and transmits the radio frequency signal representing a measurement result to the communication unit 100A.

Upon receiving the measurement result of the reception power from each slave communication unit 100, the data processing unit 11 in the communication unit 100A detects, based on the received measurement result, a frequency band in which the reception power in the slave communication unit 100 during the transmission stop period is small, namely a frequency band in which a noise level is low, and creates the frequency correspondence information based on a detection result.

In another example, the data processing unit 11 in the communication unit 100A creates the frequency correspondence information based on noise environment information representing a frequency band in which a noise level in each slave communication unit 100 is low, the noise environment information being previously stored in the storage unit 90 by a maker or a user of the on-board communication system 300.

While the on-board communication system 300 according to the first embodiment of the present invention is constituted as a system including the five communication units 100, the present invention is not limited to that case. The on-board communication system 300 may include the two or more and four or less communication units 100 or the six or more communication units 100.

While the on-board communication system 300 according to the first embodiment of the present invention is constituted as a system including the one communication unit 100 for the one function unit 2, the present invention is not limited to that case. The on-board communication system 300 may include the one communication unit 100 for the two or more function units 2.

While the on-board communication system 300 according to the first embodiment of the present invention is constituted as a system in which the communication unit 100 is connected to the function unit 2 via the wired transfer path 220, the present invention is not limited to that case. The communication unit 100 may be included in the function unit 2.

While the on-board communication system 300 according to the first embodiment of the present invention is constituted as a system including the communication unit 100 but not including the function unit 2, the present invention is not limited to that case. The on-board communication system 300 may further include the function unit 2.

While, in the on-board communication system 300 according to the first embodiment of the present invention, the wired transfer path 210 is constituted by the coaxial cable, the present invention is not limited to that case. The wired transfer path 210 may include, for example, a twisted pair cable. Furthermore, the wired transfer path 210 may include a balanced-unbalanced converter connecting the coaxial cable and the twisted pair cable.

FIG. 7 illustrates an example of a configuration of the wired transfer path in the on-board communication system according to the first embodiment of the present invention.

Referring to FIG. 7, the wired transfer path 210 includes a coaxial cable 211, a twisted pair cable 212, and a balanced-unbalanced converter 213. The balanced-unbalanced converter 213 converts a single-ended signal received through the coaxial cable 211 to a differential signal and outputs the differential signal to the twisted pair cable 212. Furthermore, the balanced-unbalanced converter 213 converts a differential signal received from the twisted pair cable 212 to a single-ended signal and outputs the single-ended signal to the coaxial cable 211.

While the on-board communication system 300 according to the first embodiment of the present invention is constituted such that the communication unit 100A functioning as the master unit creates the frequency correspondence information and that the frequency control unit 72 in the slave communication unit 100 sets the carrier frequency based on the MAC address of the function unit 2 at the transmission target, the MAC address of the function unit 2 at the transmission source, and the frequency correspondence information received from the communication unit 100A, the present invention is not limited to that case. In another example, the frequency correspondence information previously created by the maker or the user of the on-board communication system 300 may be stored in the storage unit 90, and the frequency control unit 72 in each communication unit 100 may set the carrier frequency based on the MAC address of the function unit 2 at the transmission target, the MAC address of the function unit 2 at the transmission source, and the frequency correspondence information that has been previously created. In still another example, each communication unit 100 may transmit and receive band use information representing frequency bands assigned to itself and the other communication units 100, and the frequency control unit 72 in each communication unit 100 may set the frequency band for itself based on the band use information of the other communication units 100.

While the on-board communication system 300 according to the first embodiment of the present invention is constituted such that the communication units 100 belonging to at least one pair among the multiple pairs of the communication units 100 transmit and receive therebetween the radio frequency signals at the carrier frequency different from that used by the communication units belonging to the other one or more pairs, the present invention is not limited to that case. All the communication units 100 may transmit and receive the radio frequency signals at the same carrier frequency.

While, in the on-board communication system 300 according to the first embodiment of the present invention, the communication unit 100 includes the frequency control unit 72, the present invention is not limited to that case. The communication unit 100 may be constituted without including the frequency control unit 72. In such a case, the oscillator 80 outputs a frequency conversion signal with a preset frequency, for example.

While, in the on-board communication system 300 according to the first embodiment of the present invention, the communication unit 100 includes the power control unit 73, the present invention is not limited to that case. The communication unit 100 may be constituted without including the power control unit 73. In such a case, the transmission amplifier 34 amplifies the radio frequency signal with a preset gain, for example.

While, in the on-board communication system 300 according to the first embodiment of the present invention, the communication unit 100 is constituted to be able to set the carrier frequency of the radio frequency signal, the present invention is not limited to that case. The communication unit 100 may be constituted to transmit and receive the radio frequency signals at a predetermined carrier frequency.

While, in the on-board communication system 300 according to the first embodiment of the present invention, the communication unit 100 is constituted to be able to set the transmission power of the radio frequency signal, the present invention is not limited to that case. The communication unit 100 may be constituted to transmit and receive the radio frequency signals with predetermined transmission power.

While the on-board communication system 300 according to the first embodiment of the present invention is constituted such that the communication unit 100 includes the power measuring unit 74 and that the data processing unit 11 in the communication unit 100 functions as the communication control unit, the present invention is not limited to that case. The communication unit 100A functioning as the master unit may be constituted without including the power measuring unit 74. Moreover, the data processing unit 11 in the slave communication unit 100 may be constituted not to function as the communication control unit.

While, among the pairs of the communication units 100, the two communication units 100 forming each pair are constituted to transmit and receive the radio frequency signals at the same carrier frequency therebetween, the present invention is not limited to that case. In at least one among the multiple pairs of the communication units 100, the two communication units 100 forming that one pair may be constituted to transmit the radio frequency signals at carrier frequencies different from each other. More specifically, for example, in the pair of the communication unit 100A and the communication unit 100B, the communication unit 100A transmits the radio frequency signal at a carrier frequency f11 to the communication unit 100B, and the communication unit 100B transmits the radio frequency signal at a carrier frequency f12 to the communication unit 100A.

By constituting a certain pair of the communication units 100, as described above, such that those communication units 100 transmit the radio frequency signals at the carrier frequencies different from each other, communication processing can be simplified while suppressing a communication delay that may be caused due to, for example, wait for start of transmission to avoid collision of the radio frequency signals transmitted from the communication units 100 of the relevant pair.

There is a demand for a technique capable of realizing stable communication among the function units in the vehicle with a simple configuration.

In consideration of such a demand, the on-board communication system according to the first embodiment of the present invention includes the plurality of function units 2 mounted on the vehicle 1 and performing predetermined information communication, the plurality of communication units 100 disposed respectively corresponding to the plurality of function units 2, and the plurality of wired transfer paths 210 connecting the plurality of communication units 100 to one another. Each of the plurality of communication units 100 transmits and receives the radio frequency signals to and from the other communication units via the wired transfer paths 210, those radio frequency signals including the communication information to be transferred among the function units 2.

Thus, since the wired transfer paths 210 are used in the on-board network 310 to transmit and receive the radio frequency signals including the communication information to be transferred among the function units 2, the radio frequency signals in various frequency bands and in accordance with various modulation schemes, for example, can be transferred via the wired transfer paths 210 and hence a degree of freedom in setting of communication among the function units 2 can be increased. Furthermore, since the wired transfer path 210 used as a transfer path for the radio frequency signal can be branched by using a passive component with adjustment of impedance matching, a degree of freedom in wiring can also be increased. Moreover, the number of active components required, for example, when the many communication units 100 are connected to one another via the wired transfer paths 210 can be made zero or reduced. Reduction of the number of the active components makes it possible to reduce power consumption, to suppress heat generation, and to suppress communication errors attributable to noise caused in power supply lines that are connected to the active components. In addition, since the on-board network 310 may need to use, for example, just one cable as a main line for a transfer system, it is possible to reduce the number of cables to be used and the number of connector ports to be used.

As a result, with the on-board communication system according to the first embodiment of the present invention, stable communication among the function units can be realized with a simple configuration in the on-board network. Furthermore, since the radio frequency signals are transmitted and received via the wired transfer paths, for example, cables, attenuation of the radio frequency signals can be suppressed and both the transmission power and the reception power can be reduced in comparison with the case of transmitting and receiving the radio frequency signals via antennas. Moreover, since the radio frequency signals can be transmitted and received via the wired transfer paths with the adjusted impedance matching, for example, reflection of the radio frequency signals can be significantly suppressed in comparison with a radio transfer path affected by the presence of multipaths. Hence communication using a modulation scheme with a larger multilevel number can be realized, and a communication speed can be increased.

The on-board communication system according to the first embodiment of the present invention includes the three or more communication units 100 capable of transmitting and receiving the radio frequency signals via the wired transfer paths 210 among those communication units. The communication units 100 belonging to at least one pair among multiple pairs of the communication units 100 transmitting and receiving the radio frequency signals therebetween transmit and receive the radio frequency signals at a carrier frequency different from one or more carrier frequencies used by the communication units belonging to the other one or more pairs. The radio frequency signals at the different carrier frequencies are transmitted and received via the wired transfer paths 210 in common.

With the above feature, since one pair of the communication units 100 transmit and receive the radio frequency signals at the carrier frequency different from that used by another pair, those pairs of the communication units can transmit and receive the radio frequency signals in parallel. Therefore, communication processing can be simplified while suppressing a communication delay that may be caused due to, for example, wait for start of transmission to avoid collision of the radio frequency signals in the wired transfer path.

In the on-board communication system according to the first embodiment of the present invention, the communication unit 100 can set the carrier frequency of the radio frequency signal transmitted from itself.

With the above feature, attenuation of the radio frequency signal can be suppressed and communication quality can be improved, for example, by setting the carrier frequency of the radio frequency signal to be lower as the wired transfer path 210 between the communication units 100 is longer.

In the on-board communication system according to the first embodiment of the present invention, the communication units 100 can set the transmission power of the radio frequency signal transmitted from itself.

With the above feature, deterioration of a SN ratio can be suppressed and communication quality can be improved, for example, by setting the transmission power of the radio frequency signal to be greater as the wired transfer path 210 between the communication units 100 is longer.

In the on-board communication system according to the first embodiment of the present invention, each of the plurality of communication units 100 is connected via the wired transfer path 210 to the connection unit 200 that performs at least one between multiplexing and demultiplexing for the one or more radio frequency signals.

With above feature, in the on-board communication system in which the three or more function units 2 can communicate with one another via the wired transfer paths 210 and the connection units 200, stable communication between the function units 2 can be realized with the simple configuration by transmitting and receiving the radio frequency signals including the communication information to be transferred between the function units 2.

Another embodiment of the present invention will be described below with reference to the drawings. The same or equivalent components in the drawings are denoted by the same reference signs and description of those components is not repeated.

Second Embodiment

[Configuration and Basic Operation]

A second embodiment relates to an on-board communication system that is different from the on-board communication system according to the first embodiment in including an on-board cable with a communication unit incorporated therein. Other points than described below are similar to those in the on-board communication system according to the first embodiment.

Figure 8:
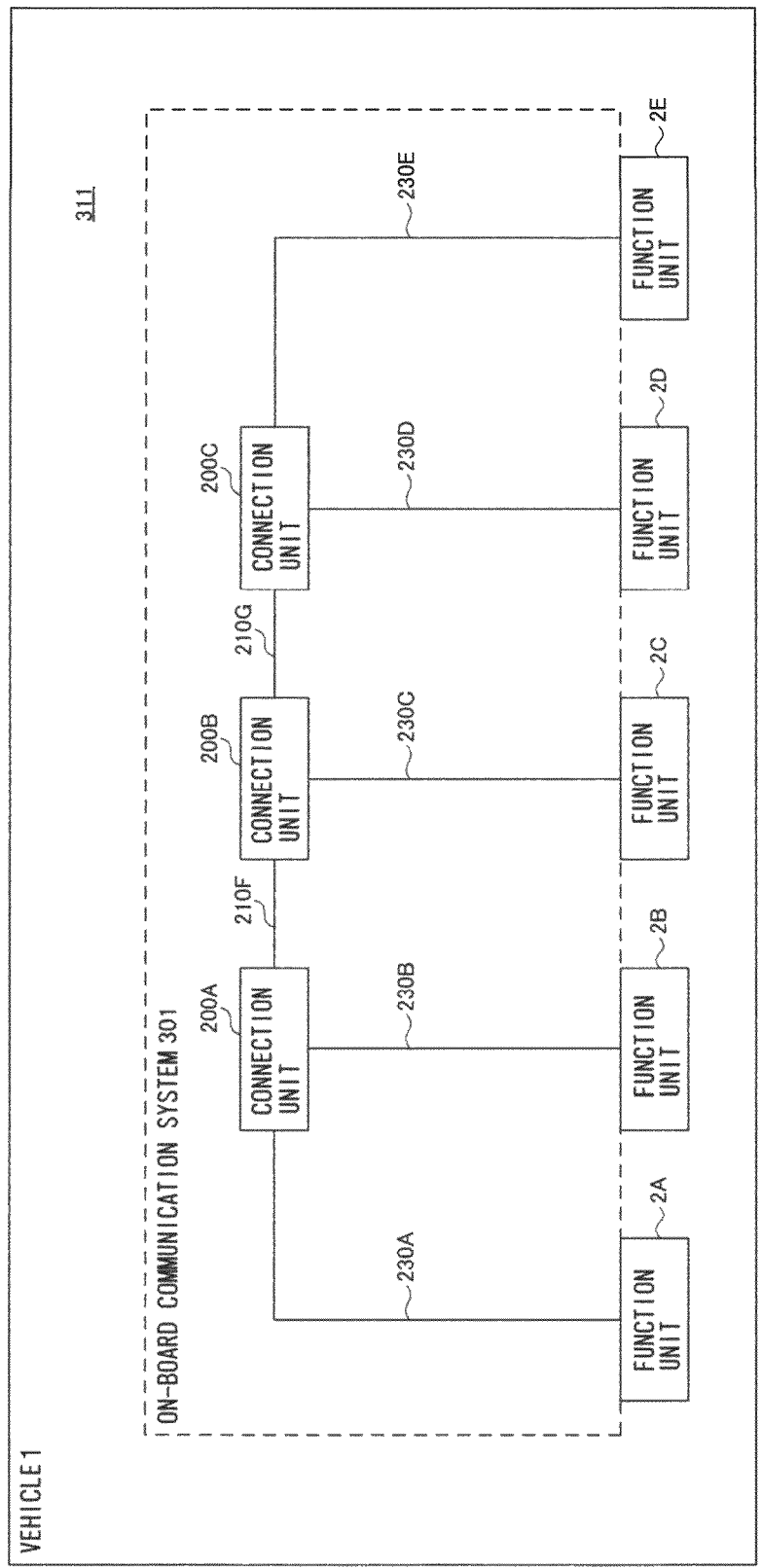
FIG. 8 is a block diagram illustrating a configuration of an on-board communication system according to a second embodiment of the present invention.

FIG. 8 is a block diagram illustrating a configuration of the on-board communication system according to the second embodiment of the present invention.

Referring to FIG. 8, the on-board communication system 301 includes a plurality of on-board cables 230A, 230B, 230C, 230D and 230E mounted on the vehicle 1. The on-board cables 230A, 230B, 230C, 230D and 230E are disposed respectively corresponding to five function units 2 mounted on the vehicle 1. In the following, each of the on-board cables 230A, 230B, 230C, 230D and 230E is also called an on-board cable 230.

For example, the function unit 2A and the connection unit 200A are connected to each other via the on-board cable 230A. The function unit 2B and the connection unit 200A are connected to each other via the on-board cable 230B. The function unit 2C and the connection unit 200B are connected to each other via the on-board cable 230C. The function unit 2D and the connection unit 200C are connected to each other via the on-board cable 230D. The function unit 2E and the connection unit 200C are connected to each other via the on-board cable 230E.

Figure 9:
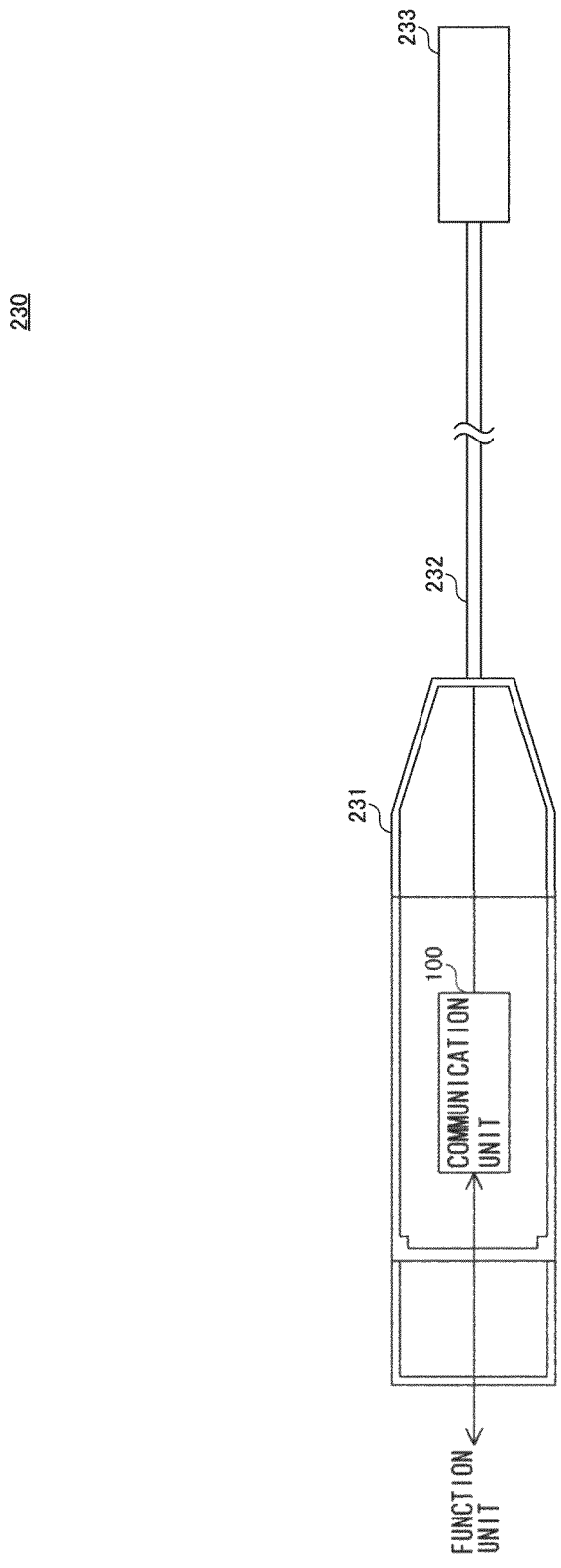
FIG. 9 illustrates an example of a configuration of an on-board cable in the on-board communication system according to the second embodiment of the present invention.

FIG. 9 illustrates an example of a configuration of the on-board cable in the on-board communication system according to the second embodiment of the present invention.

Referring to FIG. 9, the on-board cable 230 includes a connector portion 231 connectable to the function unit 2, and a cable portion 232 capable of transferring a radio frequency signal. The on-board cable 230 further includes a connector 233 at an end thereof on a side opposite to the connector portion 231, the connector 233 being connectable to the connection unit 200.

The connector portion 231 outputs, to the cable portion 232, the radio frequency signal including the communication information to be transferred between the function units 2.

In more detail, the connector portion 231 includes a communication unit 100. Upon receiving an Ethernet frame including the communication information from the function unit 2, the communication unit 100 creates a radio frequency signal including the received Ethernet frame and outputs the created radio frequency signal to the cable portion 232. Furthermore, upon receiving the radio frequency signal from the cable portion 232, the communication unit 100 creates an Ethernet frame from the received radio frequency signal and transmits the created Ethernet frame to the function unit 2.

The cable portion 232 outputs the radio frequency signal received from the connection unit 200 to the connector portion 231. Furthermore, the cable portion 232 transfers the radio frequency signal received from the function unit 2 to the connector portion 231. The cable portion 232 transfers the radio frequency signal in an unbalanced mode, for example. The cable portion 232 may be constituted to transfer the radio frequency signal on which a direct-current voltage created by the function unit 2 or the connector portion 231 is superimposed.

Figure 10:
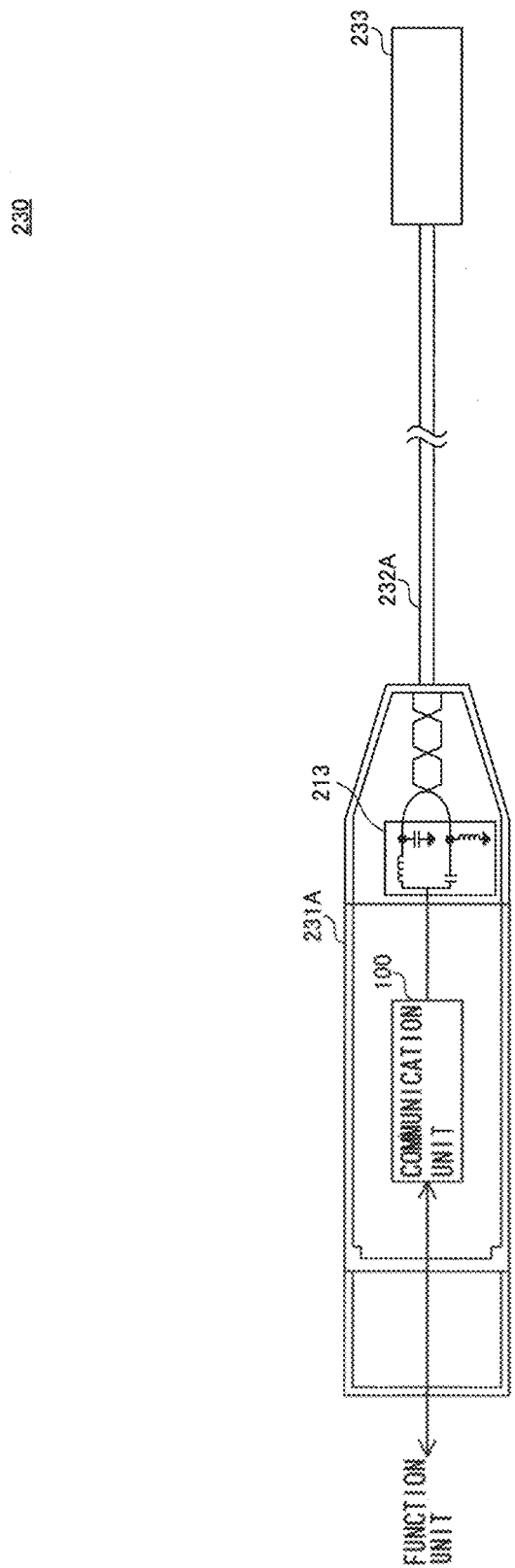
FIG. 10 illustrates another example of the configuration of the on-board cable in the on-board communication system according to the second embodiment of the present invention.

FIG. 10 illustrates another example of the configuration of the on-board cable in the on-board communication system according to the second embodiment of the present invention.

Referring to FIG. 10, the on-board cable 230 includes a connector portion 231A connectable to the function unit 2, and a cable portion 232A capable of transferring a radio frequency signal.

The connector portion 231A outputs, to the cable portion 232A, the radio frequency signal including the communication information to be transferred between the function units 2.

In more detail, the connector portion 231A includes a communication unit 100 and a balanced-unbalanced converter 213. Upon receiving an Ethernet frame including the communication information from the function unit 2, the communication unit 100 creates a radio frequency signal including the received Ethernet frame and outputs the created radio frequency signal, as a single-ended signal, to the balanced-unbalanced converter 213. The balanced-unbalanced converter 213 converts the single-ended signal received from the communication unit 100 to a differential signal and outputs the differential signal to the cable portion 232.

Furthermore, upon receiving the radio frequency signal, given as the differential signal, from the cable portion 232, the balanced-unbalanced converter 213 converts the received differential signal to a single-ended signal and outputs the single-ended signal to the communication unit 100. Upon receiving the radio frequency signal, given as the single-ended signal, from the balanced-unbalanced converter 213, the communication unit 100 creates an Ethernet frame from the received radio frequency signal and transmits the created Ethernet frame to the function unit 2.

While the on-board cable 230 according to the second embodiment of the present invention includes the connector 233, connectable to the connection unit 200, at the end thereof on the side opposite to the connector portion 231, the present invention is not limited to that case. In another example, the on-board cable 230 may include the connector portion 231 connectable to another function unit 2 instead of the connector 233, or may include a balanced-unbalanced converter, for example.

Thus, the on-board cable 230 according to the second embodiment of the present invention is mounted on the vehicle 1 including the plurality of function units 2. The on-board cable 230 includes the connector portion 231 connectable to the function unit 2, and the cable portion 232 capable of transferring the radio frequency signal. The connector portion 231 outputs, to the cable portion 232, the radio frequency signal including the communication information to be transferred between the function units 2.

With the above feature of including the connector portion 231 that outputs, to the cable portion 232, the radio frequency signal including the communication information to be transferred between the function units 2, the radio frequency signals in various frequency bands and in accordance with various modulation schemes, for example, can be transferred via the on-board cable 230 in the on-board network 310 and hence a degree of freedom in setting of communication among the function units 2 can be increased. Furthermore, since the cable portion 232 used as a transfer path for the radio frequency signal can be branched by using a passive component, the number of active components required when the many function units 2 are connected to one another via the on-board cables 230 can be made zero or reduced. Reduction of the number of the active components makes it possible to reduce power consumption, to suppress heat generation, and to suppress communication errors attributable to noise caused in power supply lines that are connected to the active components.

As a result, with the on-board cable 230 according to the second embodiment of the present invention, stable communication among the function units can be realized with a simple configuration in the on-board network.

Furthermore, in the on-board cable 230 according to the second embodiment of the present invention, the connector portion 231 includes the communication unit 100 creating the radio frequency signal. The communication unit 100 can set the carrier frequency of the radio frequency signal created by itself.

With the above feature, attenuation of the radio frequency signal can be suppressed and communication quality can be improved, for example, by setting the carrier frequency of the radio frequency signal to be lower as the wired transfer path 210 between the communication units 100 is longer.

The above-described embodiments should be considered as illustrative and not restrictive in all respects. The scope of the present invention is defined in Claims and not in the above description. All modifications falling within or being equivalent to the scope defined in Claims are intended to be included within the scope of the present invention.

The above description includes the feature stated in the following Appendix.

APPENDIX 1

An on-board communication system comprising:
one or more function units mounted on a vehicle and performing predetermined information communication;
a plurality of communication units disposed corresponding to the one or more function units; and
a plurality of wired transfer paths connecting the plurality of communication units to one another,
wherein each of the plurality of communication units transmits and receives signals in a radio frequency band to and from the other communication units via the wired transfer paths, the signals being modulated and including communication information to be transferred among the function units,
the communication units are connected respectively to the connection units via the wired transfer paths, and
each of the connection units performs at least one between multiplexing and demultiplexing for one or more of the radio frequency signals in one or more of the wired transfer paths.

REFERENCE SIGNS LIST 1 vehicle
2 function unit
100 communication unit
200 connection unit
210 wired transfer path
230 on-board cable
300 on-board communication system
301 on-board communication system

The invention claimed is:
1. An on-board communication system comprising:
a plurality of function units mounted on a vehicle and configured to transfer communication information among the function units;
a plurality of communication circuits disposed respectively corresponding to the plurality of function units; and
a plurality of wired transfer paths connecting the plurality of communication circuits to one another,
wherein each of the plurality of communication circuits transmits and receives signals in a radio frequency band to and from the other communication circuits via the wired transfer paths, the signals being modulated and including the communication information to be transferred among the function units, and
a standard used in communications between the function units and the communication circuits is different from a standard used in communication among the plurality of communication circuits, wherein each of the plurality of communication circuits is able to set a carrier frequency of the signal transmitted from itself, and each of the plurality of communication circuits sets the carrier frequency of the signal transmitted based on a length of a corresponding wired transfer path.

2. The on-board communication system according to claim 1, wherein the plurality of communication circuits includes three or more communication circuits configured to transmit and receive the signals via the wired transfer paths among the three or more communication circuits, the communication circuits belonging to at least one pair among multiple pairs of the communication circuits transmitting and receiving the signals therebetween transmit and receive the signals at a carrier frequency different from one or more carrier frequencies used by the communication circuits belonging to the other one or more pairs, and the signals at the different carrier frequencies are transmitted and received via the wired transfer paths in common.

3. The on-board communication system according to claim 1, wherein each of the plurality of communication circuits is able to set transmission power of the signal transmitted from itself.

4. The on-board communication system according to claim 1, wherein each of the plurality of communication circuits is connected via the wired transfer path to a connector that performs at least one between multiplexing and demultiplexing for one or more of the signals.

5. The on-board communication system according to claim 1, wherein the standard used in communications between the function units and the communication circuits corresponds to a controller area network (CAN) standard.

6. The on-board communication system according to claim 5, wherein the standard used in communication among the plurality of communication circuits corresponds to a wireless communication standard.

7. The on-board communication system according to claim 1, wherein the wired transfer paths include coaxial cables.

8. The on-board communication system according to claim 7, wherein the plurality of communication circuits are respectively included in connectors of the coaxial cables.

9. The on-board communication system according to claim 1, wherein the wired transfer paths include waveguides.

10. The on-board communication system according to claim 1, wherein the function units communicate with respective communication circuits via Ethernet frames.

11. The on-board communication system according to claim 10, wherein each Ethernet frame includes a MAC address of a destination function unit.

12. The on-board communication system according to claim 11, wherein each of the communication circuits convert an Ethernet frame received from a corresponding function unit into a radio frequency signal for transmission to another communication circuit.

13. The on-board communication system according to claim 12, wherein the other communication unit converts the radio frequency signal received thereby to the Ethernet frame and provides the Ethernet frame to a function unit connected thereto.

14. The on-board communication system according to claim 1, wherein each of the plurality of communication circuits sets the carrier frequency of the signal transmitted to be inversely proportional to the length of the corresponding wireless transfer path.

15. The on-board communication system according to claim 1, wherein the signals are modulated according to orthogonal frequency division multiplexing (OFDM), quadrature amplitude modulation (QAM), or phase shift keying (PSK).

16. The on-board communication system according to claim 3, wherein each of the plurality of communication circuits sets the transmission power of the signal transmitted based on gain values stored in a look up table (LUT).

17. An on-board cable mounted on a vehicle including a plurality of function units, the on-board cable comprising:

a connector configured to connect to one of the function units and to communicate with the one of the function units according to a first standard; and a cable configured to transfer, according to a second standard different from the first standard, a signal in a radio frequency band, the signal being modulated, wherein the connector outputs, to the cable, the signal including communication information to be transferred between the function units, wherein the connector includes a communication unit that creates the signal and that is able to set a carrier frequency of the signal transmitted from itself, and the communication unit sets the carrier frequency of the signal transmitted based on a length of a corresponding wired transfer path.

* * * * *